United States Patent
Hornsby

(10) Patent No.: US 6,695,970 B2
(45) Date of Patent: Feb. 24, 2004

(54) ACTUATED BYPASS VALVE AND METHOD OF USING SAME FOR REDUCING SWIMMING POOL ENERGY CONSUMPTION

(76) Inventor: Ike W. Hornsby, 10919 Galway Bay Dr., Bakersfield, CA (US) 93309

( * ) Notice: Subject to any disclaimer, the term of this patent is extended or adjusted under 35 U.S.C. 154(b) by 52 days.

(21) Appl. No.: 10/188,508

(22) Filed: Jul. 3, 2002

(65) Prior Publication Data
US 2004/0004034 A1 Jan. 8, 2004

(51) Int. Cl.[7] .............................. E04H 4/16; F16K 3/02; F16K 31/02
(52) U.S. Cl. .................... 210/805; 210/169; 210/181; 210/416.2; 251/129.02; 251/129.15; 251/321; 251/337
(58) Field of Search .................. 210/739, 767, 210/774, 805, 169, 181, 416.2; 251/129.02, 129.15, 212, 321, 336, 337

(56) References Cited

U.S. PATENT DOCUMENTS

| | | | | |
|---|---|---|---|---|
| 2,601,231 A | * | 6/1952 | Smith et al. | 137/625.33 |
| 3,786,921 A | * | 1/1974 | Johnson | 210/130 |
| 4,322,297 A | * | 3/1982 | Bajka | 210/742 |
| 4,771,982 A | * | 9/1988 | Bodine et al. | 251/129.1 |
| 5,054,522 A | * | 10/1991 | Kowanz et al. | 137/625.33 |
| 5,230,367 A | * | 7/1993 | Minch | 137/625.28 |
| 5,415,221 A | * | 5/1995 | Zakryk | 165/283 |
| 6,425,999 B1 | * | 7/2002 | Huang | 210/169 |
| 6,495,034 B1 | * | 12/2002 | Schmidtke et al. | 210/169 |
| 2003/0015477 A1 | * | 1/2003 | Hornsby, II | 210/739 |

* cited by examiner

Primary Examiner—Fred G. Prince
(74) Attorney, Agent, or Firm—James M. Duncan

(57) ABSTRACT

Actuated bypass valves for use in swimming pool systems are disclosed. The valves automatically bypasses a swimming pool heating unit except when the heating unit is placed into service. The disclosed valves reduce the energy requirements of the circulation pump when the heating unit is bypassed. The valves comprise a tee-shaped valve body. Flow within the valve body is controlled by a sliding plate which slides relative to a stationary plate, where the sliding plate and the stationary plate each has a plurality of openings. Means for actuating the valves may comprise a 24 VAC solenoid. Minimal travel of the sliding plate is necessary for the valve to open from a minimum flow area to a maximum flow area. Methods for utilizing the disclosed valves are also disclosed.

22 Claims, 3 Drawing Sheets

ACTUATED BYPASS VALVE AND METHOD OF USING SAME FOR REDUCING SWIMMING POOL ENERGY CONSUMPTION

BACKGROUND OF THE INVENTION

The present invention relates to an apparatus and method for use with swimming pool filtering systems. More particularly, this invention relates to a actuated bypass valve and method of using the same which reduces energy consumption by automatically bypassing a heater unit for a swimming pool when the heater is not in operation.

It is known that operating a swimming pool can require a substantial amount of energy. The typical residential swimming pool installation has a filtering unit through which daily flows the total volume of water in the pool. The filtering unit is normally operated for several hours per day and is used in conjunction with chemical treatment, such as chlorination, to maintain the clarity and cleanliness of the water. The pool may also have a spa connected to it. If the user desires the pool and/or spa to have heated water, a heater unit is connected to the filtering unit.

A heater unit typically utilizes a heat exchanger comprising a tube bundle through which the water flows and a heat source adjacent to the tube bundle for heat transfer to the circulating water. Because of the relatively small diameter of the tubes of the tube bundle in comparison to other piping within the system, there is a pressure drop across the tube bundle and pumping water through the tube bundle increases the energy demand of the pump motor. A common variety of heater unit has a gas burner as a heat source. The heater will have either a lit gas pilot, or it will have a pilot circuit which is activated when the user desires to ignite the heater with the ignitor controls. Once the user activates the ignitor, a gas supply valve is opened, allowing gas to flow to the burner. A pressure switch is connected to the ignitor controls, which prevents the gas supply valve from opening if there is no pressure in the tube bundle. This feature of the heater unit prevents the gas burner from being activated if there is no water in the tube bundle. Otherwise, the components of the heater unit could be severely damaged.

Water is drawn into the filtering unit and pumped through the filtering unit, the heater unit and returned to the pool with a self-priming, single suction, centrifugal type pump. A pump motor is attached directly to the seal plate of the pump. The pump motor is an open-drip proof type, capacitor start/induction run design or capacitor start/capacitor run design. Perhaps the most commonly used motor is a single phase, 60 HZ, 3450 RPM motor operating on either a 115 VAC or 230 VAC circuit.

Water may be drawn into the pump inlet from several sources. The water may come from the pool skimmer, which cleans floating debris from the surface of the water. The water may also come from a submerged drain in either the pool or spa. The water may also come from a suction vacuum which, powered by water drawn through the unit from the pump suction, travels over the submerged surfaces of the swimming pool and collects debris such as leaves, dirt, and twigs which may accumulate at the bottom and side walls of the pool. The larger debris collected by the suction vacuum, including leaves and twigs, are typically accumulated in an in-line collection basket upstream of the pump suction. Suspended debris, such as suspended dirt and silt, is collected in the filtering medium of the filtering unit.

It has long been recognized that energy consumption by swimming pools can be substantial and efforts have been made to develop equipment and procedures which increase the efficiency of the pool cleaning and circulation system and decrease the required energy demand. One known way of reducing energy demand is bypassing a heater unit when the heater is not in operation. When a heater is installed on a pool and/or spa, the pump will lose approximately 15 to 20% of its flow capacity due to water circulation through the small diameter tubes of the tube bundle of the heat exchanger of the heater unit. The reduction in flow capacity can increase the energy demand of the pump motor in two different ways. First, because all of the water in a swimming pool should be filtered on a daily basis, the pump must run longer if the flow rate is decreased. Second, the change in flow rate may cause the pump to operate at less than its optimal efficiency, thereby increasing the amount of energy required to operate the pump.

In this regard, it is known to insert a manual bypass valve so that water discharged from the filter outlet may bypass the heater unit and go directly into the return line to the pool. With the installation of the manual bypass valve, if the user does not desire to use the heater unit, the valve may be opened, eliminating the flow restriction caused by the tube bundle of the heater unit. When the user desires to use the heater unit to heat either the pool or the spa, the valve is closed so that all water is directed from the filter outlet into the heater unit.

In order to maximize energy savings, the manual bypass must be opened whenever the heater is not in use, and only closed when use of the heater is desired. The repeated opening and closing of the manual bypass is inconvenient for the user and often forgotten. Because of the long periods which may pass between demand for use of the heater unit to heat the pool or spa, it is not uncommon for a user to forget the system is in bypass mode when attempting to start the heater for the first time after a prolonged period of non-use. The user will attempt to ignite the heater, but because there is no water flow in the tube bundle, the pressure switch prevents gas flow to the burner. Users will frequently call pool service companies believing there is something wrong with the heater, when in fact it is only necessary to shut the bypass valve.

There is a need for a bypass valve which is normally open, when the heater unit is not in operation, but which automatically diverts fluid flow to the heater when the heater unit is activated, without the user having to manually open or close the bypass valve. It is desirable that such an automated bypass valve be inexpensive to purchase and repair and of simple design.

SUMMARY OF THE INVENTION

The present invention is directed to an apparatus and method for reducing swimming pool energy consumption, meeting the needs identified above.

An actuated valve for reducing swimming pool energy consumption is disclosed. The valve comprises a tee-shaped valve body, where the body has a first axis defined by a first leg and a second leg opposite the first leg. A second axis is defined by a third leg, where the third leg is perpendicular to the first leg and second leg and the second axis is perpendicular to the first axis. An inlet is formed by the first leg of the tee and an outlet is formed by the second leg of the tee. A stationary plate is attached within the valve body with attachment means. The stationary plate has a first face, where the first face has a plurality of openings. The stationary plate is attached within the valve body such that the first face is perpendicular to the first axis and parallel to the second axis. A sliding plate is slideably attached within the valve body such that the sliding plate is parallel to and abutting the stationary plate. The sliding plate has a second face, where the second face has a plurality of openings. The sliding plate is slideable in the direction of the second axis. A flow area is created by the positioning of the plurality of openings of the second face with respect to the openings of the first face. Actuating means are attached to the sliding plate for sliding the sliding plate in a direction parallel to the second axis. The actuating means are activated by an electrical current, wherein the flow area is decreased when the actuating means is activated. Biasing means are attached to the sliding plate. The biasing means maintain the flow area at a maximum size when the actuating means is not activated. Sealing means seal off the third leg.

Methods of reducing swimming pool energy consumption are also disclosed, the methods comprising steps for utilizing embodiments of the disclosed valve.

These and other features, aspects, and advantages of the present invention will become better understood with regard to the following description, appended claims, and accompanying drawings.

DETAILED DESCRIPTION OF THE EMBODIMENTS

Figure 1:
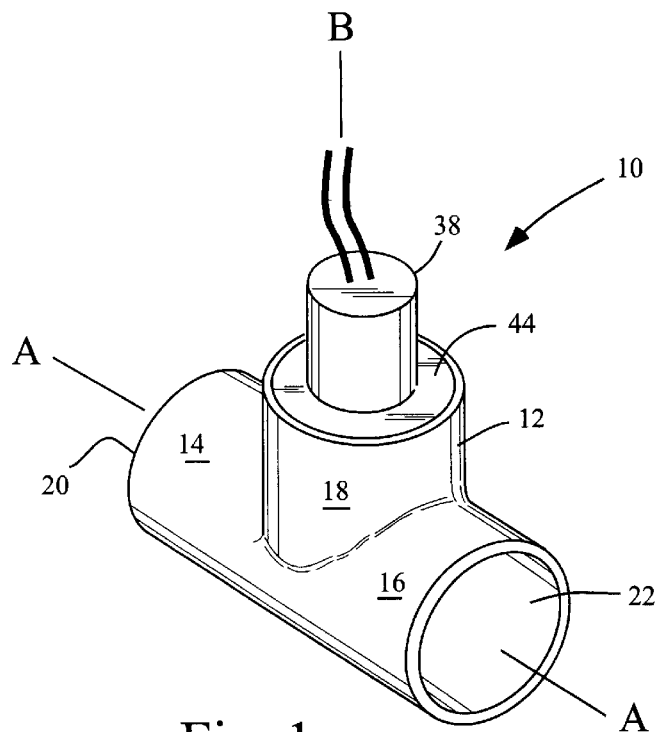
FIG. 1 shows a perspective view of the disclosed automated bypass valve.
Figure 2:
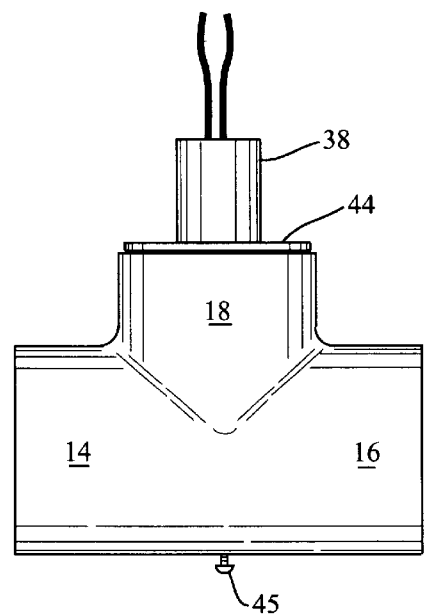
FIG. 2 shows a side view of the disclosed automated bypass valve.

Referring now specifically to the drawings, FIGS. 1 through 4 show the exterior components of the disclosed actuated bypass valve 10. The valve 10 generally comprises a tee-shaped valve body 12, where the body 12 has a first axis A defined by a first leg 14 and a second leg 16 opposite the first leg. A second axis B is defined by a third leg 18, where the third leg is perpendicular to the first leg 14 and the second leg 16 and the second axis B is perpendicular to the first axis A. An inlet 20 is formed by the first leg 14 of the tee and an outlet 22 is formed by the second leg 16 of the tee. In its most simple form, valve body 12 may be formed from a PVC Tee. For application in a residential pool environment, a PVC Tee in a size ranging from 2 inches to 3 inches may be used.

A stationary plate 24 is attached within the valve body 12 with attachment means, such as plate supports 26. Plate supports 26 may be glued or otherwise attached within the valve body 12, or the plate supports may be formed as an integral part of the valve body 12 if the valve body is cast or manufactured by an injection mold process.

The stationary plate 24 has a first face 28, where the first face has a first plurality of openings 30. The stationary plate 24 is attached within the valve body 12 such that the first face 28 is perpendicular to the first axis A and parallel to the second axis B. A sliding plate 32 is slideably attached within the valve body 12 such that the sliding plate 32 is parallel to and abutting the stationary plate 24. The sliding plate 32 has a second face 34, where the second face has a second plurality of openings 36. The sliding plate 32 also has a top end 33 and a bottom end 35. The sliding plate 32 is guided and laterally retained by plate guides 37, which may be glued or otherwise attached within the valve body 12, or the plate guides may be formed as an integral part of the valve body if the valve body is cast or manufactured by an injection mold process.

The sliding plate 32 is slideable in the direction of the second axis B. A flow area is created by the positioning of the second plurality of openings 36 of the second face 34 with respect to the openings 30 of the first face 28. Actuating means, such as a solenoid 38 combined with an operating rod 40 are attached to the sliding plate 32 for sliding the sliding plate in a direction parallel to the second axis B. The operating rod 40 may be bonded to the plunger of the solenoid using known adhesives, or an integral plunger/operating rod may be implemented. The solenoid 38 may be attached to cap 44, which acts as sealing means for sealing off the third leg 18.

The actuating means are activated by an electrical current, such that the flow area is decreased when the actuating means is activated. An acceptable solenoid 38 is model number 701-24AB2C available from Industrial Plastic Valves Company of Carson City, Nev. This solenoid uses a series 701 solenoid coil, operating at 24 VAC. Many 24 VAC solenoids are acceptable, including those which are sold off-the-shelf at many facilities for use with automatic irrigation and sprinkler systems. The 24 VAC solenoid is desirable, because the voltage to the pressure switch of most heater units is 24 VAC, although the input voltage to the controls of a heater unit is commonly 120 or 240 VAC.

It is to be appreciated that the flow area of the disclosed valve is adjusted by the relative position of the sliding plate 32 with respect to the stationary plate 24, because adjusting the relative position of the sliding plate with respect to the stationary plate changes the respective arrangements of the first plurality of openings 30 of the first face 28 of the stationary plate 24 with respect to the second plurality of openings 36 of the second face 34. The more the openings 36 of the sliding plate 32 line up with the openings 30 of the stationary plate 24, the larger the flow area.

Figure 3:
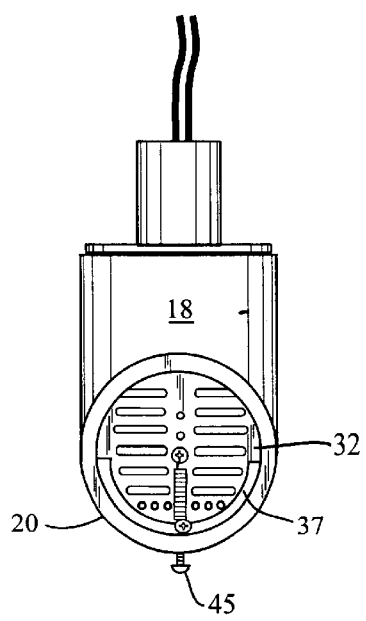
FIG. 3 shows a view facing the inlet of the disclosed valve.
Figure 4:
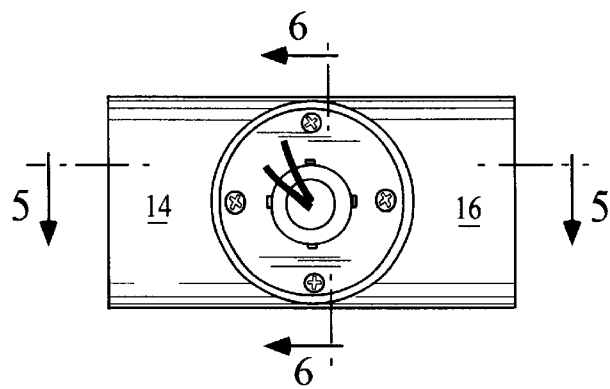
FIG. 4 shows a top view of the disclosed valve.
Figure 6A:
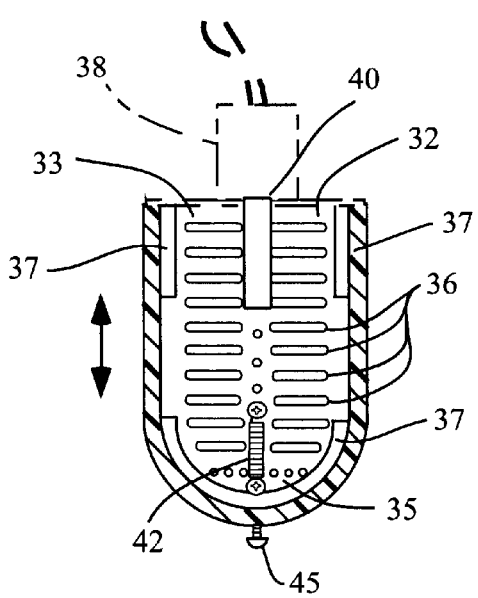
FIG. 6A shows a sectional view along line 6—6 of FIG. 4, when the valve is in a first open position.
Figure 6B:
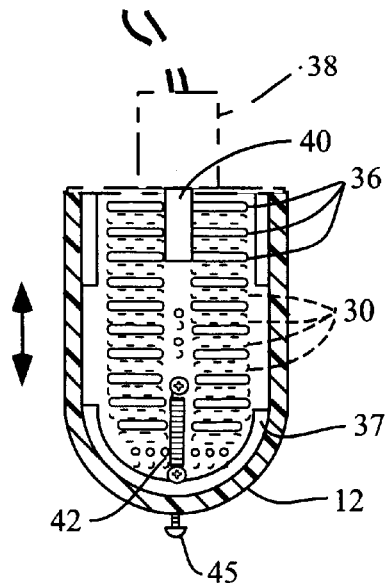
FIG. 6B shows a sectional view along line 6—6 of FIG. 4, when the valve is in a second closed position.

In one embodiment of the valve 10, the dimensions of the stationary plate 24 may be equivalent to the dimensions of the sliding plate 32, and the pattern of the first plurality of openings 30 of the first face 28 may match the pattern of the second plurality of openings 36 of the second face 34, as shown in FIGS. 3, 6A and 6B. In these figures, the first plurality of openings 30 and the second plurality of openings 36 may comprise a series of slots and holes. It has been found for a 2" valve body that a maximum flow area of 1.76 square inches works well. It is to be appreciated that for the valve shown in FIGS. 3, 6A and 6B, a very small movement of sliding plate 32 along axis B results in the valve being either fully open or fully closed. Such minimal travel is desirable because the plunger of solenoid 38 generally has limited travel, approximately ⅛" to ¼".

Figure 5:
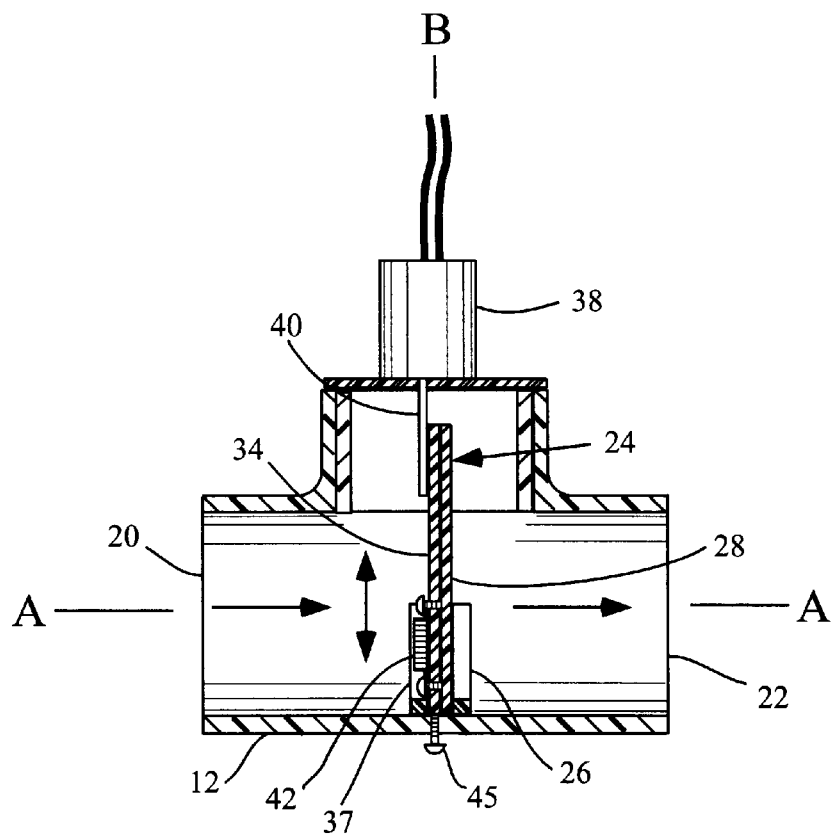
FIG. 5 shows a sectional view along line 5—5 of FIG. 4.

Biasing means, such as a spring 42 are attached to the sliding plate 32 and the valve body 12. The biasing means maintain the flow area at a maximum size when the actuating means is not activated, where the biasing means retains the sliding plate in a first open position along the second axis. In this first open position of the sliding plate 32, the second plurality of openings 36 of the second face 34 are in facing relation with the first plurality of openings 30 of the first face 28. When the actuating means are activated, the sliding plate 32 may be placed in a second closed position wherein the second plurality of openings 36 of the second face 34 are in facing relation to portions of the first face 28 having no openings. Therefore, the sliding plate 32 is retained in the first open position except when the actuating means are activated. As shown in FIG. 5, an adjustment screw 45 may be inserted through valve body 12, so that the tip of the adjustment screw engages sliding plate 32. The adjustment screw allows the user to manually adjust the amount of bypass.

Unlike most other valves, the disclosed actuated valve 10 is designed so that even in the fully closed position, a certain amount of bypass is allowed through the valve. The valve described herein is not one which requires a positive seal in the bypass valve. Water will begin to flow through the tube bundle of the heater unit once the flow area of the valve has been restricted such that the head required to pump through the bypass valve is equivalent to the head required to pump through the tube bundle. Further closing of the bypass valve will result in greater flow through the heater unit. However, the bypass valve is intended to allow a bypass of approximately 20% even when the valve is in the "closed position." Because solenoid 38 must be energized for the valve 10 to be in a "closed" position, the bypassing liquid serves to cool the solenoid.

Figure 7:
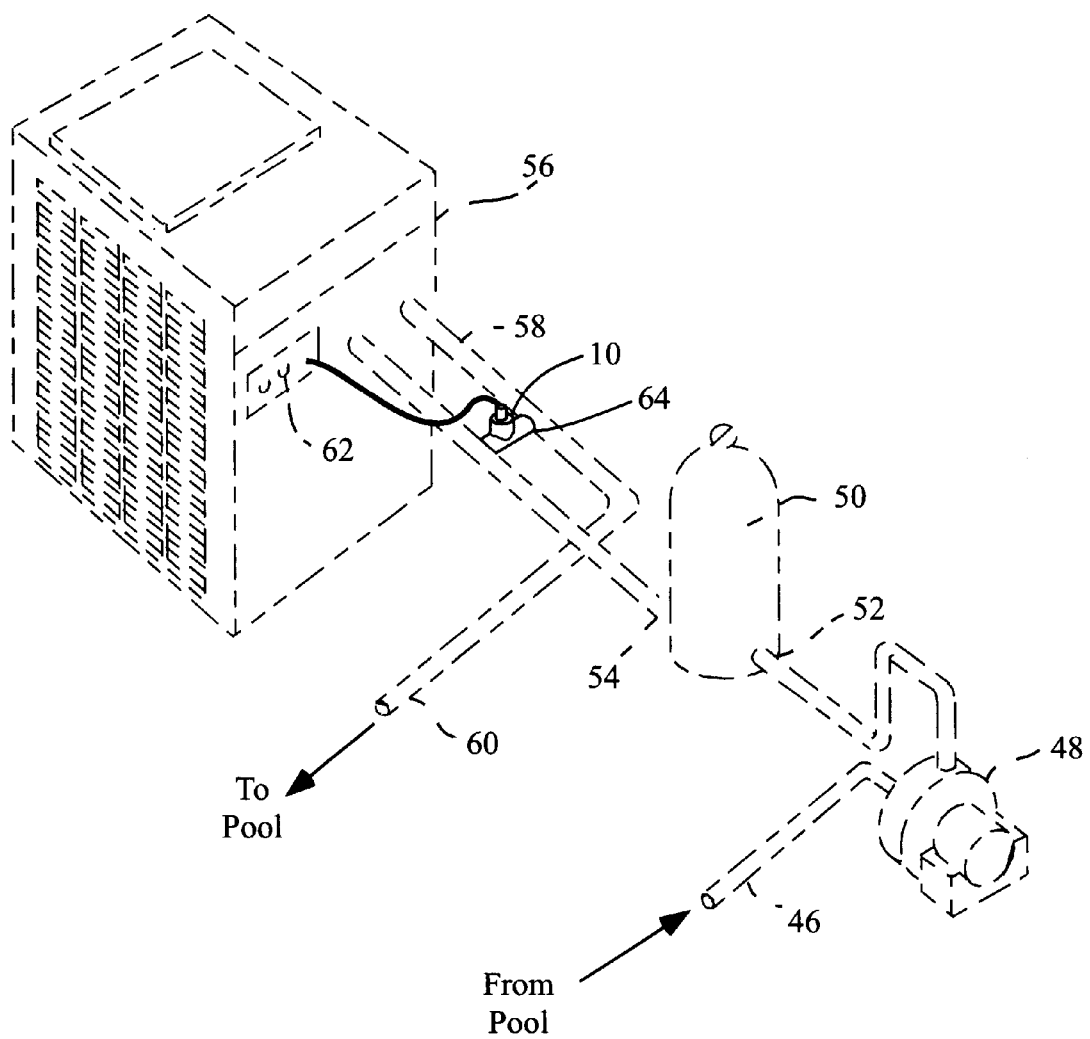
FIG. 7 is a schematic of a pump, filter and heater unit of a swimming pool, showing a possible placement of the disclosed valve.

A method of using the disclosed actuated bypass valve is also disclosed. A "swimming pool system" may be thought of as the swimming pool itself, plus means for filtering and heating the water. A schematic of the means for filtering and heating the water is depicted in FIG. 7. The swimming pool system will have at least one suction line 46 from the pool to the suction end of a pump 48. A filter 50 for removing particulate matter from the pool water has an inlet 52 and an outlet 54, where the inlet is connected to the discharge side of the pump 48. The filter outlet 54 is connected to a heater unit 56. The heater unit 56 has an outlet 58 connected to a return line 60 for returning filtered water to the pool. The heater unit 56 has an electrical switch or control 62 which activates a valve for directing gas to the heater burner, which heats water circulating in a tube bundle adjacent to the heater burner. For this type of swimming pool system, a method is disclosed for reducing swimming pool energy consumption. The method comprises the steps of connecting a bypass line 64 from the filter outlet 54 to the return line 60 to allow bypassing the heater unit 56. An embodiment of the actuated valve 10 disclosed herein is installed in the bypass line 64, wherein the actuated valve has actuating means, such as solenoid 38. The electrical switch or control 62 of the heater unit 56 is connected to the actuating means such that the actuating means is activated when the electrical switch is activated. When heated water is desired, the user activates the electrical switch or control 62 of the heater unit 56, which energizes the actuating means connected to the actuated valve 10. When the actuating means are energized, the flow area of the actuated valve 10 is reduced to a minimum size and water flows through the tube bundle of the the heater unit 56, where the water is heated by the heater burner. When heated water is no longer desired, the electrical switch or control 62 of the heater unit 56 is switched off so that gas no longer flows to the heater unit. When the electrical switch or control 62 is switched off, the actuating means of the actuated valve 10 are no longer energized and the flow area of the actuated valve returns to its maximum size, so that the heater units 56 is bypassed once again. The above method may be utilized for each embodiment of the actuated bypass valve disclosed herein.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. An actuated bypass valve for reducing swimming pool energy consumption comprising:
   (a) a tee-shaped valve body, the body having a first axis defined by a first leg and a second leg opposite the first leg and a second axis defined by a third leg, the third leg perpendicular to the first leg and second leg and the second axis perpendicular to the first axis;
   (b) an inlet formed by the first leg of the tee and an outlet formed by the second leg of the tee;
   (c) a stationary plate having a first face, the first face having a first plurality of openings, the stationary plate attached within the valve body with attachment means such that the first face is perpendicular to the first axis and parallel to the second axis;
   (d) a sliding plate having a second face, the second face having a second plurality of openings, the sliding plate slideably attached within the valve body such that the sliding plate is parallel to and abutting the stationary plate, and slideable in the direction of the second axis, a flow area created by the positioning of the second plurality of openings with respect to the first plurality of openings, the flow area having a maximum size and a minimum size;
   (e) actuating means attached to the sliding plate for sliding the sliding plate in a direction parallel to the second axis, the actuating means activated by an electrical current, wherein the flow area is having the minimum size when the actuating means is activated;
   (f) biasing means attached to the sliding plate, said biasing means maintaining the flow area at the maximum size when the actuating means is not activated; and
   (g) sealing means for sealing the third leg.

2. The actuated bypass valve of claim 1, wherein the actuating means comprises a solenoid, the solenoid having a solenoid coil and a solenoid plunger, and an operating rod having a first end connected to the plunger and a second end attached to the sliding plate.

3. The actuated bypass valve of claim 2, wherein the solenoid has input voltage of approximately 24 VAC.

4. The actuated bypass valve of claim 1, wherein the stationary plate and the sliding plate are the same size.

5. The actuated bypass valve of claim 4, wherein the first plurality of openings of the first face correspond to the second plurality of openings of the second face.

6. The actuated bypass valve of claim 5, wherein the sliding plate has a first open position along the second axis wherein the second plurality of openings of the second face are in facing relation with the first plurality of openings of the first face, and a second closed position wherein the second plurality of openings of the second face are in facing relation to portions of the first face having no openings.

7. The actuated bypass valve of claim 6 wherein the biasing means hold the sliding plate in the first open position except when the actuating means are activated.

8. An actuated bypass valve for reducing swimming pool energy consumption comprising:
  (a) a tee-shaped valve body, the body having a first axis defined by a first leg and a second leg opposite the first leg and a second axis defined by a third leg, the third leg perpendicular to the first leg and second leg and the second axis perpendicular to the first axis;
  (b) an inlet formed by the first leg of the tee, an outlet formed by the second leg of the tee, and a valve chamber formed by the third leg, the third leg having an end;
  (c) a sealing cap connected to the end of the third leg, the sealing cap having an opening;
  (d) a stationary plate having a first face, a top end, and a bottom end, the first face having a first plurality of openings, the stationary plate attached within the valve body with attachment means such that the first face is perpendicular to the first axis and parallel to the second axis and the top end is disposed in the valve chamber;
  (e) a sliding plate having a second face, a top end, and a bottom end, the second face having a second plurality of openings, the sliding plate slideably attached within the valve body such that the sliding plate is parallel to and abutting the stationary plate, and slideable in the direction of the second axis, and the top end of the sliding plate is disposed in the valve chamber, wherein a flow area is created by the positioning of the second plurality of openings of the second face with respect to the first plurality of openings of the first face, the flow area having a maximum size and a minimum size;
  (f) a solenoid, the solenoid comprising a coil and plunger, the solenoid attached to the sealing cap, an operating rod extending through the opening in the sealing cap, the operating rod having a first end connected to the plunger and a second end attached to the top end of the sliding plate, wherein the flow area is set at the minimum size when the solenoid is energized; and
  (g) biasing means attached to the sliding plate, said biasing means maintaining the flow area at the maximum size when the solenoid is not energized.

9. The actuated bypass valve of claim 8, wherein the solenoid has input voltage of approximately 24 VAC.

10. The actuated bypass valve of claim 8, wherein the stationary plate and the sliding plate are the same size.

11. The actuated bypass valve of claim 10, wherein the pattern of the first plurality of openings of the first face corresponds to the pattern of the second plurality of openings of the second face.

12. The actuated bypass valve of claim 11, wherein the sliding plate has a first open position along the second axis wherein the second plurality of openings of the second face are in facing relation with the first plurality of openings of the first face, and a second closed position wherein the second plurality of openings of the second face are in facing relation to portions of the first face having no openings.

13. The actuated bypass valve of claim 12 wherein the biasing means holds the sliding plate in the first open position except when the solenoid is energized.

14. The actuated bypass valve of claim 12 wherein flowby occurs when the sliding plate is the second closed position.

15. In a swimming pool system having a pool, at least one suction line from the pool to the suction end of a pump, a filter for removing particulate matter from the pool water, the filter having an inlet and outlet, the filter inlet connected to the pump discharge and the filter outlet connected to a heater unit, the heater unit having an outlet connected to a return line for returning filtered water to the pool, the heater having an electrical switch which activates a valve for directing gas to the heater burner, a method for reducing swimming pool energy consumption comprising the steps of:
  (a) connecting a bypass line from the filter outlet to the return line to allow bypassing the heater unit;
  (b) installing an actuated valve in the bypass line, the actuated valve comprising:
    (i) a tee-shaped valve body, the body having a first axis defined by a first leg and a second leg opposite the first leg and a second axis defined by a third leg, the third leg perpendicular to the first leg and second leg and the second axis perpendicular to the first axis;
    (ii) an inlet formed by the first leg of the tee and an outlet formed by the second leg of the tee;
    (iii) a stationary plate having a first face, the first face having a first plurality of openings, the stationary plate attached within the valve body with attachment means such that the first face is perpendicular to the first axis and parallel to the second axis;
    (iv) a sliding plate having a second face, the second face having a second plurality of openings, the sliding plate slideably attached within the valve body such that the sliding plate is parallel to and abutting the stationary plate, and slideable in the direction of the second axis, a flow area created by the positioning of the second plurality of openings of the second face with respect to the first plurality of openings of the first face, the flow area having a maximum size and a minimum size;
    (v) actuating means attached to the sliding plate for sliding the sliding plate in a direction parallel to the second axis, the actuating means activated by an electrical current, wherein the flow area is maintained at the minimum size when the actuating means is activated;
    (vi) biasing means attached to the sliding plate, said biasing means maintaining the flow area at the maximum size when the actuating means is not activated;
    (vii) sealing means for sealing the third leg;
  (c) connecting the electrical switch of the heater unit to the actuating means wherein the actuating means is activated when the electrical switch is activated to direct gas to the heater burner so that the flow area is at the minimum size when gas is directed to the heater burner;
  (d) activating the electrical switch when heated water is desired; and
  (e) switching the electrical switch off when heated water is not desired so that the flow area of the actuated valve is at the maximum size.

16. In a swimming pool system having a pool, at least one suction line from the pool to the suction end of a pump, a filter for removing particulate matter from the pool water, the filter having an inlet and outlet, the filter inlet connected to the pump discharge and the filter outlet connected to a heater unit, the heater unit having an outlet connected to a return line for returning filtered water to the pool, the heater having an electrical switch which activates a valve for directing gas to the heater burner, a method for reducing swimming pool energy consumption comprising the steps of:
  (a) connecting a bypass line from the filter outlet to the return line to allow bypassing the heater unit;

(b) installing an actuated valve in the bypass line, the actuated valve comprising:
  (i) a tee-shaped valve body, the body having a first axis defined by a first leg and a second leg opposite the first leg and a second axis defined by a third leg, the third leg perpendicular to the first leg and second leg and the second axis perpendicular to the first axis;
  (ii) an inlet formed by the first leg of the tee, an outlet formed by the second leg of the tee, and a valve chamber formed by the third leg, the third leg having an end;
  (iii) a sealing cap connected to the end of the third leg, the sealing cap having an opening;
  (iv) a stationary plate having a first face, a top end, and a bottom end, the first face having a first plurality of openings, the stationary plate attached within the valve body with attachment means such that the first face is perpendicular to the first axis and parallel to the second axis and the top end is disposed in the valve chamber;
  (v) a sliding plate having a second face, a top end, and a bottom end, the second face having a second plurality of openings, the sliding plate slideably attached within the valve body such that the sliding plate is parallel to and abutting the stationary plate, and slideable in the direction of the second axis, and the top end of the sliding plate is disposed in the valve chamber, wherein a flow area is created by the positioning of the second plurality of openings of the second face with respect to the first plurality of openings of the first face, the flow area having a maximum size and a minimum size;
  (vi) a solenoid, the solenoid having a coil and plunger, the solenoid attached to the sealing cap, an operating rod extending through the opening in the sealing cap, the operating rod having a first end connected to the plunger and a second end attached to the top end of the sliding plate, wherein the flow area is maintained at the minimum size when the solenoid is energized;
  (vii) biasing means attached to the sliding plate, said biasing means maintaining the flow area at the maximum size when the solenoid is not energized;
(c) connecting the electrical switch of the heater unit to the solenoid wherein the solenoid is energized when the electrical switch is activated to direct gas to the heater burner so that the flow area is maintained at the minimum size when gas is directed to the heater burner;
(d) activating the electrical switch when heated water is desired; and
(e) switching the electrical switch off when heated water is not desired so that the flow area of the actuated valve is maintained at the maximum size.

17. The method of claim 16 wherein the solenoid has input voltage of approximately 24 VAC.

18. The method of claim 16, wherein the stationary plate and the sliding plate of the actuated valve are the same size.

19. The method of claim 18 wherein the pattern of the first plurality of openings of the first face corresponds to the second plurality of openings of the second face.

20. The method of claim 19 wherein the sliding plate has a first open position along the second axis wherein the second plurality of openings of the second face are in facing relation with the first plurality of openings of the first face, and a second closed position wherein the second plurality of openings of the second face are in facing relation to portions of the first face having no openings.

21. The method of claim 20 wherein the biasing means holds the sliding plate in the first open position except when the solenoid is energized.

22. The method of claim 20 wherein flowby occurs when the sliding plate is the second closed position.

* * * * *